(12) United States Patent
Shah et al.

(10) Patent No.: US 9,659,314 B2
(45) Date of Patent: May 23, 2017

(54) METHOD AND APPARATUS FOR TAGGING NETWORK TRAFFIC USING EXTENSIBLE FIELDS IN MESSAGE HEADERS

(71) Applicant: Bridge and Post, Inc., Little Rock, AR (US)

(72) Inventors: Nitin J. Shah, Cupertino, CA (US); Jasminder S. Banga, San Francisco, CA (US); Miten Sampat, San Francisco, CA (US); Amul Patel, Pacifica, CA (US)

(73) Assignee: Bridge and Post, Inc., Little Rock, AR (US)

( * ) Notice: Subject to any disclaimer, the term of this patent is extended or adjusted under 35 U.S.C. 154(b) by 390 days.

(21) Appl. No.: 14/512,348

(22) Filed: Oct. 10, 2014

(65) Prior Publication Data
US 2015/0032550 A1    Jan. 29, 2015

Related U.S. Application Data (63) Continuation of application No. 12/045,693, filed on Mar. 10, 2008, now Pat. No. 8,862,747.
(Continued)

(51) Int. Cl.
*G06F 15/16* (2006.01)
*G06Q 30/02* (2012.01)
(Continued)

(52) U.S. Cl.
CPC ......... *G06Q 30/0269* (2013.01); *H04L 67/18* (2013.01); *H04L 67/20* (2013.01);
(Continued)

(58) Field of Classification Search
CPC ..... H04L 67/18; H04L 67/20; H04L 67/2804; H04L 67/306
(Continued)

(56) References Cited

U.S. PATENT DOCUMENTS

| 5,933,497 A | 8/1999 | Beetcher et al. |
| 5,983,227 A | 11/1999 | Nazem et al. |

(Continued)

FOREIGN PATENT DOCUMENTS

| DE | 10004738 C1 | 8/2001 |
| WO | 2005/088991 A1 | 9/2005 |

OTHER PUBLICATIONS

PCT/US08/56454, Form PCT/ISA/220, "PCT Notification of Transmittal of the International Search Report and the Written Opinion of the International Searching Authority, or the Declaration," mailed Aug. 29, 2008, 1 page.
(Continued)

*Primary Examiner* — Bryan Lee
(74) *Attorney, Agent, or Firm* — Dergosits & Noah LLP (57) ABSTRACT

Embodiments within describe a system and method of tagging network traffic with relevant user information for facilitating the delivery of directed media. In an embodiment, a user identifier is generated from user information. Network traffic from the user and bound for a destination site is tagged within a network routing device. The tagged traffic is tagged with a request identifier that has the user identifier encrypted in an alphanumeric string. The tagged network traffic is transmitted to the destination site. A request is received from the destination site to decode the tagged network traffic, retrieve stored user information, and transmit the stored user information to the destination site.

21 Claims, 8 Drawing Sheets

Related U.S. Application Data (60) Provisional application No. 60/894,195, filed on Mar. 10, 2007.

(51) Int. Cl.
*H04W 4/02* (2009.01)
*H04L 29/08* (2006.01)

(52) U.S. Cl.
CPC ........ *H04L 67/2804* (2013.01); *H04L 67/306* (2013.01); *H04W 4/02* (2013.01); *G06Q 2220/00* (2013.01)

(58) Field of Classification Search
USPC ...................................................... 709/227
See application file for complete search history.

(56) References Cited

U.S. PATENT DOCUMENTS

| | | | |
|---|---|---|---|
| 6,487,538 | B1 | 11/2002 | Gupta et al. |
| 6,647,269 | B2 | 11/2003 | Hendrey et al. |
| 6,757,740 | B1 | 6/2004 | Parekh et al. |
| 7,107,317 | B2 | 9/2006 | Demsky et al. |
| 7,155,508 | B2 | 12/2006 | Sankuratripati et al. |
| 7,299,050 | B2 | 11/2007 | Delaney et al. |
| 7,490,135 | B2 | 2/2009 | Klug et al. |
| 7,493,655 | B2 * | 2/2009 | Brown ................... G06Q 30/02 705/7.34 |
| 7,624,190 | B1 | 11/2009 | Aviani et al. |
| 7,778,636 | B2 | 8/2010 | Rolf |
| 7,793,213 | B2 | 9/2010 | Shmukler et al. |
| 7,917,390 | B2 | 3/2011 | Feinberg |
| 7,945,585 | B1 | 5/2011 | Sorkin et al. |
| 7,953,390 | B2 | 5/2011 | White et al. |
| 8,086,491 | B1 | 12/2011 | Matz et al. |
| 8,107,972 | B2 | 1/2012 | Kim et al. |
| 8,131,585 | B2 | 3/2012 | Nicholas et al. |
| 8,214,462 | B1 | 7/2012 | Rosenberg et al. |
| 8,233,429 | B1 | 7/2012 | Fingerhut |
| 8,239,510 | B2 | 8/2012 | Houri |
| 8,364,168 | B2 | 1/2013 | Nardini |
| 8,457,052 | B2 | 6/2013 | Fingerhut |
| 8,463,942 | B2 | 6/2013 | Parekh et al. |
| 8,521,140 | B2 | 8/2013 | White et al. |
| 8,538,803 | B2 | 9/2013 | Nicholas et al. |
| 8,548,820 | B2 | 10/2013 | Matz et al. |
| 8,631,142 | B2 | 1/2014 | Hesmer et al. |
| 8,640,160 | B2 | 1/2014 | Stefanik et al. |
| 8,688,085 | B2 | 4/2014 | White et al. |
| 8,787,164 | B2 | 7/2014 | Julia et al. |
| 8,813,123 | B2 | 8/2014 | Khoo et al. |
| 8,825,527 | B2 | 9/2014 | Urbanski et al. |
| 9,426,255 | B2 | 8/2016 | Kembel et al. |
| 9,536,245 | B2 | 1/2017 | Shmukler et al. |
| 2003/0036949 | A1 | 2/2003 | Kaddeche et al. |
| 2003/0041156 | A1 | 2/2003 | Pickover et al. |
| 2006/0137015 | A1 | 6/2006 | Fahrny et al. |
| 2006/0282411 | A1 | 12/2006 | Fagin et al. |
| 2007/0124818 | A1 | 5/2007 | Bumiller et al. |
| 2008/0189360 | A1 | 8/2008 | Kiley et al. |
| 2008/0270417 | A1 * | 10/2008 | Roker ................... G06Q 30/02 |
| 2010/0049613 | A1 | 2/2010 | Angeles et al. |
| 2010/0138299 | A1 | 6/2010 | Preston et al. |
| 2016/0037324 | A1 | 2/2016 | Karaoguz et al. |

OTHER PUBLICATIONS

PCT/US08/56454, Form PCT/ISA/210, "PCT International Search Report," mailed Aug. 29, 2008, 3 pages.

PCT/US08/56454, Form PCT/ISA/237, "PCT Written Opinion of the International Searching Authority," mailed Aug. 29, 2008, 5 pages.

PCT/US08/56454, Form PCT/IB/373, "PCT International Preliminary Report on Patentability," mailed Aug. 29, 2008, 1 page.

\* cited by examiner

| | |
|---|---|
| Host: | pgl.yoyo.org |
| User Agent: | Mozilla/5.0 (Windows; U; Windows NT 6.0; en-US; rv:1.8.1.12) Gecko/20080201 Firefox/2.0.0.12 |
| Accept: | text/xml,application/xml,application/xhtml+xml,text/html;q=0.9,text/plain;q=0.8,image/png,*/*;q=0.5 |
| Accept-Language: | en-us,en;q=0.5 |
| Accept-Encoding: | gzip,deflate |
| Accept-Charset: | ISO-8859-1,utf-8;q=0.7,*;q=0.7 |
| Cache-Control: | max-age=0 |
| F-T: | 0104f7c3fe920045aae414fcc5434f6995f87afa4b1ae1c7a03b56080c380d41 |
| Max-Forwards: | 10 |
| Connection: | Keep-Alive |

502 ⟶ (pointing to F-T row)

Header Code: F-T

Size of FT: 64 bytes

Schema: Version | NetworkTime | Source | Identifier | Demo | Geocode(ZIP)

| VERSION | TIME | SOURCE | LUID | DEMO | GEO |
|---------|------|--------|------|------|-----|
| 610 | 612 | 614 | 616 | 618 | 620 |

METHOD AND APPARATUS FOR TAGGING NETWORK TRAFFIC USING EXTENSIBLE FIELDS IN MESSAGE HEADERS

CROSS REFERENCE TO RELATED APPLICATIONS

The present application is a continuation of pending U.S. application Ser. No. 12/045,693, filed on Mar. 10, 2008, entitled "Method And Apparatus For Tagging Network Traffic Using Extensible Fields In Message Headers," and which claims the benefit of the U.S. Provisional Application No. 60/894,195 entitled "Systems, Methods and Computer Program Products Including Session and Tagging Features," and filed on Mar. 10, 2007. The present application is related to PCT Application No. PCT/US08/56454, entitled "Method And Apparatus For Tagging Network Traffic Using Extensible Fields In Message Headers," and filed Mar. 10, 2008.

FIELD

Embodiments of the invention relate generally to network data processing, and more particularly, to tagging network traffic with user relevant information.

BACKGROUND

The ability to provide directed or targeted message delivery to users based on network access is of critical importance to content providers, such as online is advertisers. Traditional means of mass communication, such as radio and television broadcast all accommodate some degree of customized content delivery for ads and messages targeted at a localized group of consumers, even in the context of widely distributed or nation-wide programming. For example, in-band message delivery, such as used by television and radio networks, allows for the insertion of localized ads between national ad slots or content. This targeted content delivery is made possible by the control of localized content by local broadcasters within a distinct area, such as a city or state.

In the context of wide-scale global computer networks, such as the Internet, in-band message delivery techniques are not applicable since content is essentially provided point-to-point between a very large number of individual users and content providers, with no intermediate distribution control. Within the framework of Internet Protocol (IP) communication over the Internet and the World Wide Web, certain mechanisms have been adopted by content providers to tailor content to specific classes of users. During a typical web browsing session a user on a client computer will access content on a server computer through a GET request that specifies the network address of relevant content. Typically this involves providing the URL (Uniform. Resource Locator) of a web page of interest on the destination site. The content provider server computer then serves the page through a POST operation. Existing systems and methods of processing network requests often include components that obtain valuable information about client devices or the users that initiated the requests. Such components generally employ, or at least obtain or process personally identifiable information (PII) regarding a specific user associated with the request and may rely on mechanisms such as HTTP (hypertext transport protocol) cookies as a foundation of that information. Web cookies are parcels of text sent by a server to a web browser that are sent back unchanged by the browser each time it accesses that server. They are used to authenticate, track and maintain information about users, such as site preferences or contents of electronic shopping carts. Cookies suffer from several disadvantages, such as concerns regarding Internet privacy and the ability of users to disable or erase cookies during browsing sessions. Moreover, the information provided by cookies may not be very accurate, and does not often identify or profile a user to a sufficient degree that allows a content provider from serving directed content to the user. Present methods of delivering content also have several drawbacks relating to user profiling. For example, because most websites can only mark the behavior of users that have visited the site, they only gain a compartmentalized view of the user based on the website's limited past experience with the user. Users are also required to visit the particular website that set the cookie, or other marker, before it can be used to deliver any targeted content. Because of limitations of cookie technology, online content providers typically do not determine whether the user who is accessing the page originates from a particular location or has a particular demographic background. Such location and demographic information can be very valuable in determining the type and frequency of directed content that should be served to users during a web browsing session. Problems of present marker technology are particularly notable in the mobile computing environment. In the context of mobile client devices, cookies and other markers can quickly become irrelevant or hopelessly inaccurate. For example, the content displayed, played, or streamed on a website (e.g., audio, video, etc.) may be drastically different from the statistically consumed content that is distributed and consumed in an offline manner in that geographic area, including the language of the content as well as the genre of content (i.e., video clips, audio clips, ad messages, etc.).

Traditional methods of delivering targeted messages over the Internet have often relied on. IP addresses of client devices. To some extent, the IP address of the device provides some indication of device location. The IP address method, however, has proven to be highly unreliable, with some estimates indicating correlation between IP address and location only as high as 60%. Such inaccuracy is due to a number of factors, such as use of proxy addresses, dynamic IP addressing, and other factors. The ever-increasing use of mobile clients will only exacerbate the inaccuracy of IP address based location determination techniques. Besides user location, user profile or demographic information, such as gender, age, race, income level, consumption preferences, and the like can also be of great value in serving targeted content. Such information however is usually difficult for online content providers to obtain. Traditional methods, such as questionnaires are often utilized, but are not often popular with users, and are not made widely available to all possible content providers. Other less intrusive measures, such as use of historical information, browsing patterns, and marker technology are woefully inaccurate, and raise familiar privacy concerns.

A major class of targeted content providers is the Internet advertiser. However, increased exposure to online ads is leading Internet users to become increasingly unreceptive to traditional advertising techniques such as banner ads or pop-up windows. Thus, advertisers are resorting to more content-rich advertising, where advertising is done more suggestively through content-placement at strategic points in a presentation. Content-rich advertising is effective but demands greater data bandwidth thus leaving less time for content deliverers to process user-profile related information and make real-time targeting decisions. Moreover, with increasing concerns about privacy and data security, a large number of users routinely delete cookies and other tracking information stored on their computers making such targeting decisions difficult, if not impossible. As a result, content servers have resorted to a fixed pool of content that is served up to website-users round robin with little or no effort directed at targeting. Drawbacks associated with present directed content serving solutions, thus prevent such providers with the effective means of delivering truly relevant advertisements and other directed messages to users who may most benefit from such targeted delivery. These drawbacks also prevent effective and efficient revenue modeling for advertising content deliverers based on inaccurate accountability metrics, such as click-through rates by users. For example, revenue streams often depends on the number of users responding to an advertisement rather than specific receipt information directed to quantifiable accountability of advertisements served to users. Ad networks and advertisers lose revenue because poorly accounted for/targeted advertising generally results in lower click-through rates. This prevents companies from formulating truly effective online advertising campaigns. In view of the above limitations, there is currently a need to optimize the manner in which targeted online content is delivered. In particular, there is a need to provide content providers with a method and system which enables them to accurately deliver the most applicable content to their users, so as to ensure higher access rates, longer browse times, and increased consumption of media, all in a manner that maintains user privacy and data integrity.

SUMMARY

Embodiments of a system and method of tagging network traffic with relevant user demographic and location information for facilitating the delivery of directed media are described. A tag processing module within a router device coupling a client computer to a destination site served by a server computer intercepts a request from a client computer to a server computer over a network. The tag processing module determines a unique device identifier corresponding to the client computer, generates a local user identifier for the client computer by performing a one-way hashing operation on the unique device identifier, derives demographic and location (geographic) information for a user of the client computer, generates a request identifier associated with the intercepted request by encrypting the local user identifier, demographic information and geographic location information in an alphanumeric string, and embeds the alphanumeric string in an extensible field of a packet within the request to generate a tagged request identifier. The destination site receives the alphanumeric string comprising the tagged request identifier and transmits a request to a tag-related processing service to decode the request identifier. In response to the request, the tag-related processing service provides the corresponding location and demographic information to the destination site. Using this information, the destination site, or any associated ad partner or other supplemental content provider can serve directed ads or messages through the destination site to the client computer.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and sub-combinations of several further features disclosed below in the detailed description.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

In the following description, numerous specific details are introduced to provide a thorough understanding of and enabling description for, embodiments of a network traffic tagging process. One skilled in the relevant art, however, will recognize that these embodiments can be practiced without one or more of the specific details, or with other components, systems, and so on. In other instances, well known structures or operations are not shown, or are not described in detail, to avoid obscuring aspects of the disclosed embodiments.

Many systems and environments are used in connection with networks, network operation, and associated information processing. These systems and environments can be implemented with a variety of components, including various permutations of the hardware, software, and firmware disclosed below. Throughout the following description, the terms "component," "module," or "process" may be used interchangeably to denote a hardware circuit, software program, or combination hardware/software structure that is configured to perform a particular task.

Figure 1:
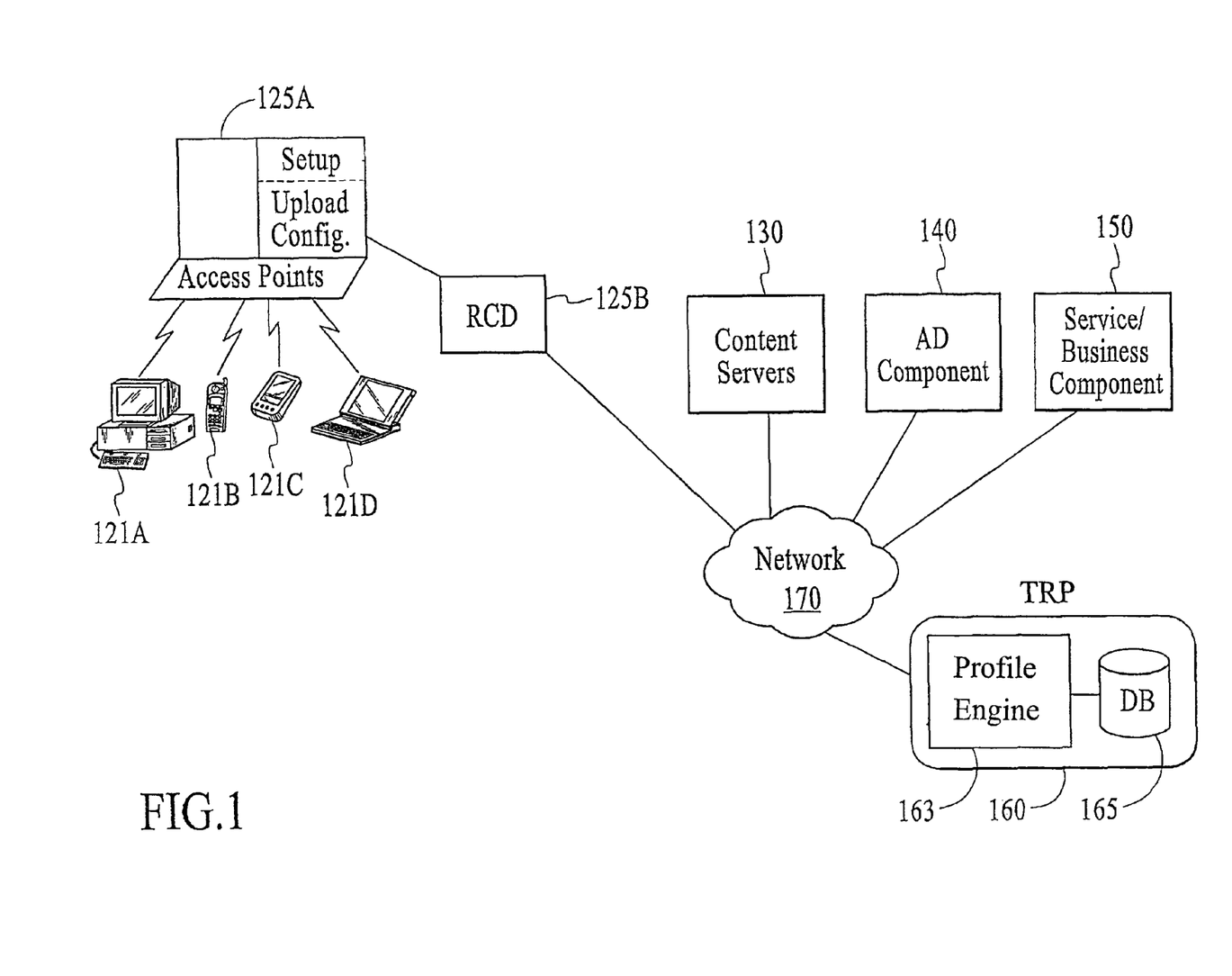
FIG. 1 is a diagram off an example network system consistent with one or more embodiments.

FIG. 1 illustrates a block diagram of an example system consistent with one or more embodiments described herein. While the description of FIG. 1 is directed to the illustrated hardware and software elements, the components of the system can be implemented through any suitable unitary or distributed combination of hardware, software and/or firmware. The system of FIG. 1 may include an access device 121 (e.g., one or more of access devices 121A-121D), one or more routing/connectivity device ("ROD") components 125 (e.g., access points 125A, routers or other access/connectivity devices 125B, etc.), a tag-related processing ("TRP") component 160, as well as other unitary, connected, interconnected or distributed processing entities or components such as other routers or additional providers such as network management components, content servers 130, ad components 140, service/business components 150, and other third party entities/components, connected via a network 170, such as the World Wide Web. Data processing between the RCDs 125, the access devices 121 and their users, and the other components, over the network 170, is used to implement various aspects of information, unique identifier (UID) and tag-related processing disclosed herein.

When a network user/internet-connected-device begins, restarts or continues a browsing session through an access device 121 to obtain Internet based content, several network connectivity-granting devices within the network may be utilized to initiate, continue or facilitate operation. The access devices 121 consistent with the embodiments described herein may include any suitable computing device, such as client computers, laptop computers, personal digital assistants (PDA), mobile devices (e.g., mobile phones), gaming devices, media playback devices, etc., interconnected by any means, for any length of time, for the purpose of utilizing information or features consistent with various applications, such as processing digital content associated with or delivered in connection with the tag-based functionality set forth herein.

During system operation, a request from a user of an access device 121 associated with a browsing session on the network may be transmitted from access device 121 to a first RCD component 125B. Subsequent communication between the first RCD component 125B and the router or network management component sets the stage for operations of generating UIDs as well as inserting UIDs/tags into web-bound requests, as set forth herein. For example, methods of, first, generating global unique identifiers associated with web/network-related requests may comprise, in the context of processing a web-bound request associated with a browsing session, receiving information associated with a device that initiated a web-bound request, extracting non-personal/device information during MAC/network layer processing, wherein the non-personal/device information includes one or more of data associated with a device/user, data related to the device, software on the device, and/or any user/input data that is resident on the device, and creating a persistent, anonymous UID based on the non-personal/device information. Further, enablement of a globally persistent UID (GUID) correlates as a function of the extraction of non-personal/device data during MAC/network layer processing. Further, methods of inserting a UID into a web-bound request may comprise, in the context of processing a web-bound request associated with a browsing session, extracting non-personal/device information during MAC/network layer processing, creating an anonymous UID based on the non-personal/device information, and inserting the UID in the HTTP header or other extensible locations within the web-hound request.

In the embodiment illustrated in FIG. 1, the routing/connectivity device is comprised of a first RCD component 125A (e.g., an access point) and a second RCD component 125B (e.g., a gateway, first router, etc.), although the RCD may readily be implemented as a unitary or otherwise distributed system element(s).

The information stored in various system components, such as user profile information, may be updated over network 170 using information gathered by RCDs 125 from users 121 connecting with or attempting to connect to the network. In some embodiments the RCDs or routers may request user and device profile is information from the various information-providing components if the particular user or device has accessed the system on a prior occasion. In some embodiments, user or device profile information may be downloaded to a local network cache (not shown) for quicker access. In some embodiments, according to the present invention, multiple routers and/or servers may be used and physically and geographically distributed across network 170. Network 170 could be a LAN (Local Area Network), WAN (Wide Area Network) or the Internet. Further, a request associated with the network may be associated with a user of an access device in that the request may either be an explicit instruction of the user or it may simply be the result of the user's innate access device functionality. In some embodiments, the RCD 125 could be consistent with existing access point ("AP") systems such as remote wireless access points/servers from generic providers. In some embodiments, the present information processing system may also be used or implemented with wired technology. Embodiments of the present system may also include signal amplifiers, external antennas, signal splitters, and other standard equipment as components.

In some embodiments, the servers and related systems shown in FIG. 1 may be standard off-the-shelf components, routers and/or server class computing components. For example, a router of the present invention may be implemented with, e.g., a Cisco 6500 or 7600 Router, or comparable routers from other manufacturers, and the web server can be a MS IIS server. Additionally, any other programs or code capable of accessing and/or providing information in the database may also be used. In further embodiments, the system, servers, and/or system elements may use languages such as SQL, XML, SOAP, ASP, and HTTP, etc., to enable data transmission and processing, although any suitable programming language or tool could also be used.

Systems and methods of the present invention can be implemented on a variety of networks, including wireless networks such as WiFi, WiMAX, and any mobile Ethernet network. Systems and methods can also be implemented on wired is and other networks, such as Cable, DSL and Fiber-based broadband networks, or any combinations of wired and wireless networks (e.g. combined Cable+WiFi). Certain embodiments of the present invention, as set forth herein, pertain to wireless/WiFi systems (not limited to varieties of WiFi 802.11b/a/g/n mobile Ethernet standards) and associated methods of information processing.

Certain implementations may collect and provide pertinent information about a user by virtue of collecting information about the access device associated with the user. Thus, the information is anonymous in the sense that it is not a profile of a particular user, but rather information associated with a computing device they use. This information can be related to the device, the temporary or permanent software on the device, and/or any user-input data which is resident on the device. Any or all these data may be captured and retained, and indexed with an identifier, unique identifier (UID) such as a MAC identifier, so the information from a repeat user can be verified and enhanced each time the same device accesses the network. While acquired information could be, for example, the full range of unrestricted information typically sought by commercial entities, aspects of the present innovations enable specific non-PIT implementations consistent with prohibitions dictating that end user name, race, phone numbers, addresses, and other personally identifiable or sensitive information is not collected/disclosed in adherence to restrictions or local laws, such as those directed to privacy, and user trust.

Implementations of the system of FIG. 1 can also include a profile engine having the capability of processing unique identifier data and/or any other specific software or hardware-based identifier information. The profile engine may be a subcomponent of one of the components shown, such as the TRP component 160, although it may also be distributed anywhere within the system of FIG. 1. As shown in FIG. 1, TRP component 160 includes a profile engine 163, database 165 and relevant software components to tag the network traffic with appropriate user or user device information. For example, in one embodiment, the profile engine 163 may include an algorithm designed to profile the identifier data/user based on the frequency and locations that the associated access device joins a network, coupled with other user data such as non-personal/device information. Such profile information can be correlated in the processor, weighted according to value (such as incremental numeric value, etc.), and then assigned for various additional processing purposes. For example, it can be placed in profile groups or pools to enable correlation with sponsors interested in that type or group of users. When a user begins or continues association with the network, the identifier can be associated with a location tag, and the request associated with this information can be matched up with an appropriate sponsor for that location. Content that is directly targeted to the user is thereby enabled, including customized content from third-party databases that contain information related to the location. For example, the customized content may include information about the location itself, places, attractions, and events in the proximity of that location, as well as information related to what has happened and what will happen in that locality (e.g. historical events, future community or concert events, sale events planned at the local stores, etc.).

In one embodiment, the profile engine 163 provides a decode function that looks up relevant user profile information within database 165 in response to a decode request from a content server or supplemental message server computer. In one embodiment, the request comprises a key that is encoded within a tag associated within an HTTP header or other extensible field that is part of network traffic between a client computer and the content server or supplemental message server. According to such further embodiments, the profile processing provided by TRP 160 can provide highly relevant, targeted information, advertising or specific services that are unique to each user from the same network. Further, repeated accesses to and/or use of the network by a user enables the profile engine to collect more and more network usage information for the user or associated access device. Additionally, the profile engine may also determine trend rates per geographic zone, which is of value to advertisers in the local region or remote sponsors seeking local presence. This can allow for local advertising, local billing of services, and the ability is of nationwide advertisers and brands to customize their content according to a location or groups of locations with similar characteristics. In some embodiments, user and/or device profile information received by a content server from RCD component 125 or a router or network management component may be used by the content server to determine which advertisements to retrieve from an ad source, such as ad component 140.

Figure 2:
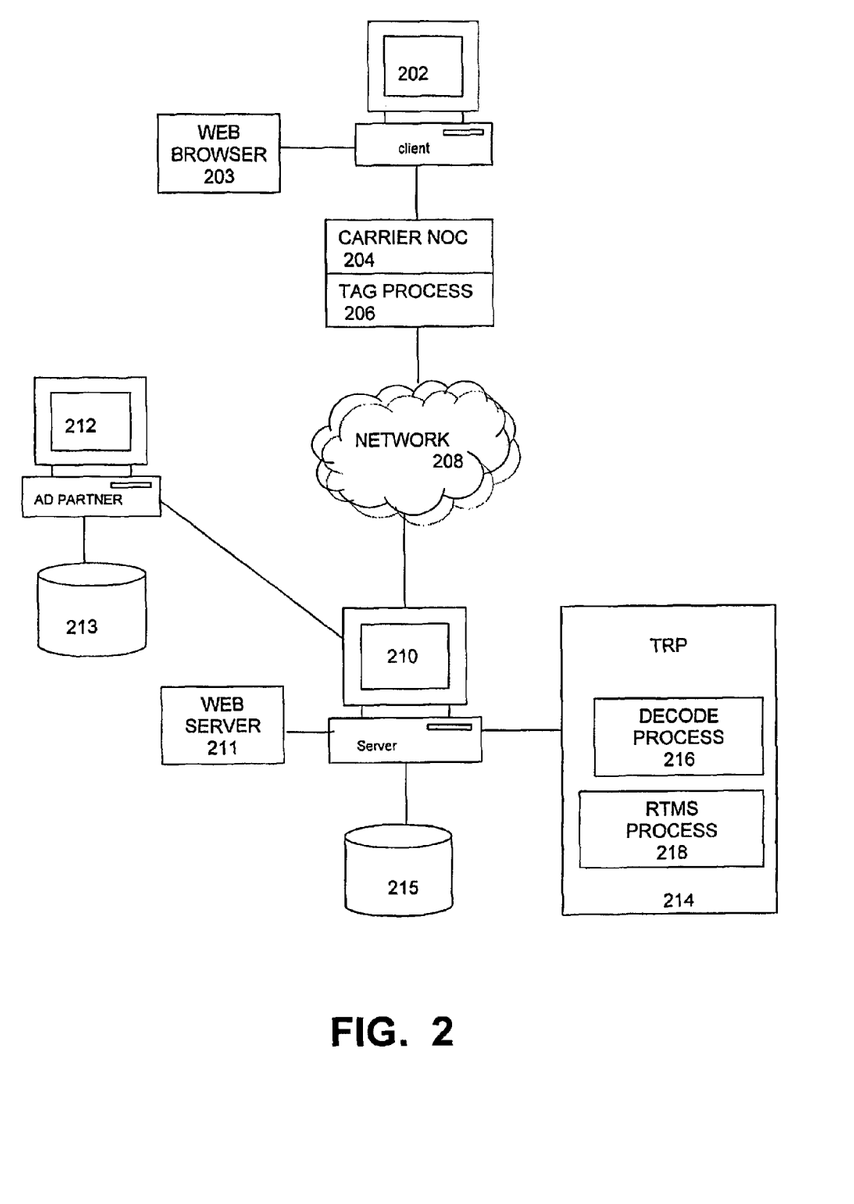
FIG. 2 illustrates a client-server network including a network tagging component, according to an embodiment.

In one embodiment, a network traffic tagging component utilizes information that is collected in a telecommunications-based access network, such as WiFi, WiMAX, mobile, DSL (digital subscriber line), cable, IPTV (Internet Protocol Television), etc., to be used by destination sites, such as web server sites, publishers, content providers, peer-to-peer sites, user generated content sites, advertising networks, search engines, and so on. The network tagging component obtains relevant user and user device information, such as accurate location data and demographic information, and formats the information into a small footprint and universally accessible format. FIG. 2 illustrates a client-server network including a network tagging component, according to an embodiment. As shown in FIG. 2, a client computing device 202 accesses network 208 through a telecommunications pathway provided by carrier network operation center (NOC) 204 One or more routers (e.g., RCD 125) may also be inserted in the transmission line between client 202 and network 208. The environment shown in FIG. 2 illustrates a standard IP-based access system in which client 202 executing a web browser process 203 accesses a web site destination 210 served by server computer 210 executing a web server process 211 The web server 210 provides content in the form of web pages which may be sourced from a local database 215 or remotely from other servers or data stores. One or more supplemental messages, such as advertisements, may be served by an ad server 212, or similar supplemental content provider that has its own data store 213. The ad server generates ads or supplemental messages that are embedded in, or displayed in conjunction with the content served by the web server 210.

As shown in FIG. 2, a tag processor component 206 is associated with carrier NOC 204. The tag processor component may be a software or hardware component that is included within the functionality provided by carrier NOC 204 (as well as RCD 125B in FIG. 1), or it may be a component that is tightly or loosely coupled to carrier NOC 204. The tag processor component 206 obtains certain identification information associated with the client 206 and encodes the identification information into a portion of the network traffic transmitted by client 202 to server 210. This information is then used by ad partner 212 to determine which ads or messages from among a selection of ads (such as may be stored in database 213) to transmit to server 210 for incorporation into content that is served back to client 202. A separate tag related process (TRP) 214 decodes the encoded identification information and provides the corresponding geographic and location information to the server 210. The TRP 214 can also compile relevant traffic data related to the client 202, or even multiple client computers This traffic data can then be used by ad partner 212 to dictate appropriate ad serving campaigns.

Figure 3:
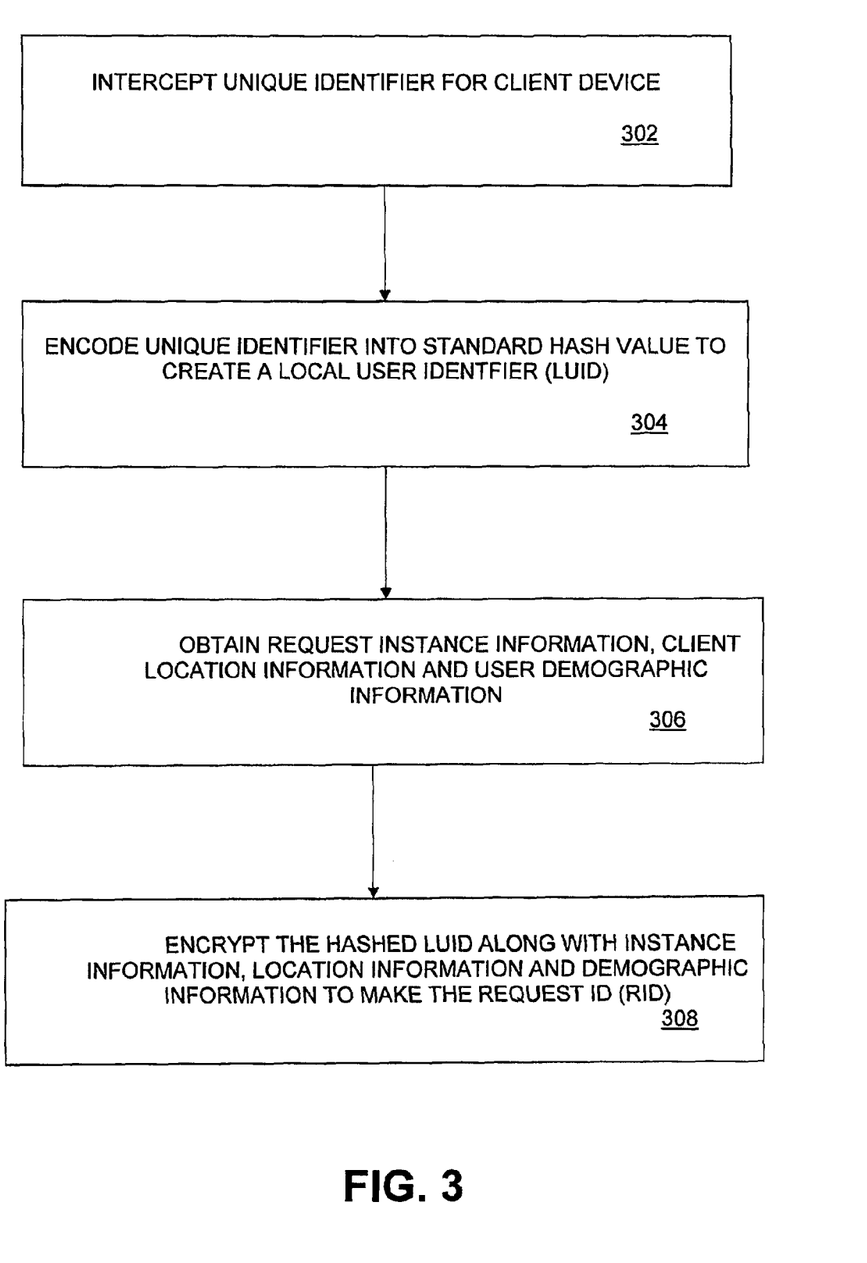
FIG. 3 is a flowchart that illustrates a method of generating a request ID, under an embodiment.

In one embodiment, the tag processor component 206 generates a unique request ID (RID) based on certain information associated with the client 202 and the user. FIG. 3 is a flowchart that illustrates a method of generating a request ID, under an embodiment. The tag processor 206 first intercepts the unique identifier (DID) for the client device, block 302. The unique identifier can be the MAC address, port identifier, or any other hardcoded unique identifier assigned to the client 202. In the case of a mobile device, such as a cellular phone, the unique identifier can be the SIM (subscriber identity module) number, or similar identifier. The DID is then encoded using a standard one-way hash algorithm to create a Local User ID (LUID). Alternatively, any equivalent coding method that ensures adequate privacy may be used to encode the UID as an LUID. In block 306, the tag processor 206 obtains instance information relating to the request, as well as location information relating to the client device and demographic information relating to the user. The instance information can comprise time of the request and can be obtained from clock or is timing circuitry within the client computer, or any routing devices that transmit the request. The location information can comprise zip code, phone area code, latitude/longitude, street address, or other available location information for the client device, and may be obtained from location circuitry, such as GPS (global positioning system) circuitry within the client or any associated router or access point, or it may be provided by a database that has such location information. The demographic information can be any relevant profile information related to the user, such as gender, age, race, occupation, income level, product or service preferences, and so on, and may be provided by profile data held by the client device or third party services or related databases. The LUID is then encrypted along with the instance information, location information, and demographic information to generate a Request ID (RID)

Figure 4:
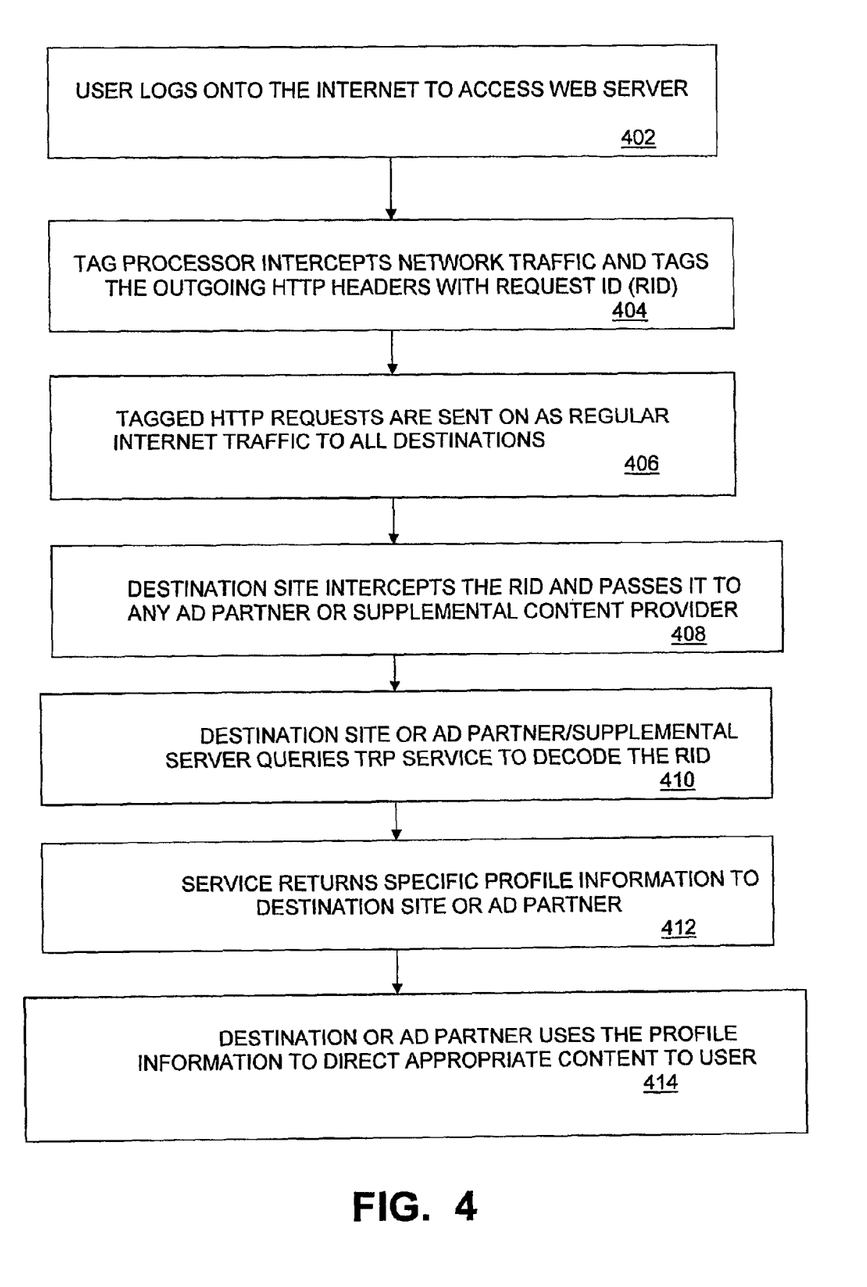
FIG. 4 is a flowchart that illustrates a method of tagging network traffic with relevant user and/or network client information, under an embodiment.

Once the RID has been generated by the tag processor, it is associated with (tagged to) the network traffic between the client and server computers. FIG. 4 is a flowchart that illustrates a method of tagging network traffic with relevant user and/or network client information, under an embodiment. In block 402, the user, through client 202, logs onto the network and attempts to connect to server 210 over the web network (Internet) 208. During this process, the HTTP requests being made will pass through the carrier NOC 204. Standard HTTP requests include various content fields, such as headers and data fields. They also accommodate incremental information from the network and adjunct databases, as these requests are distributed without filtering across the Internet. In one embodiment, the RID is encrypted in the extensible space of the HTTP header in an appropriate format. In an alternative embodiment, the TCP Option in the Transmission Control Protocol can be used to encode the RID. In a further alternative embodiment, both the HTTP and TCP Option can be used to encode all or respective portions of the RID.

As shown in block 404, at the carrier NOC, the tag processor intercepts the client network traffic comprising the HTTP requests, and tags the outgoing HTTP headers with the request ID's formed in block 308 of FIG. 3. The tagged HTTP is requests are then sent on as regular Internet traffic to all destinations on the Internet, as opposed to only destinations on a single network, block 406.

Figure 5:
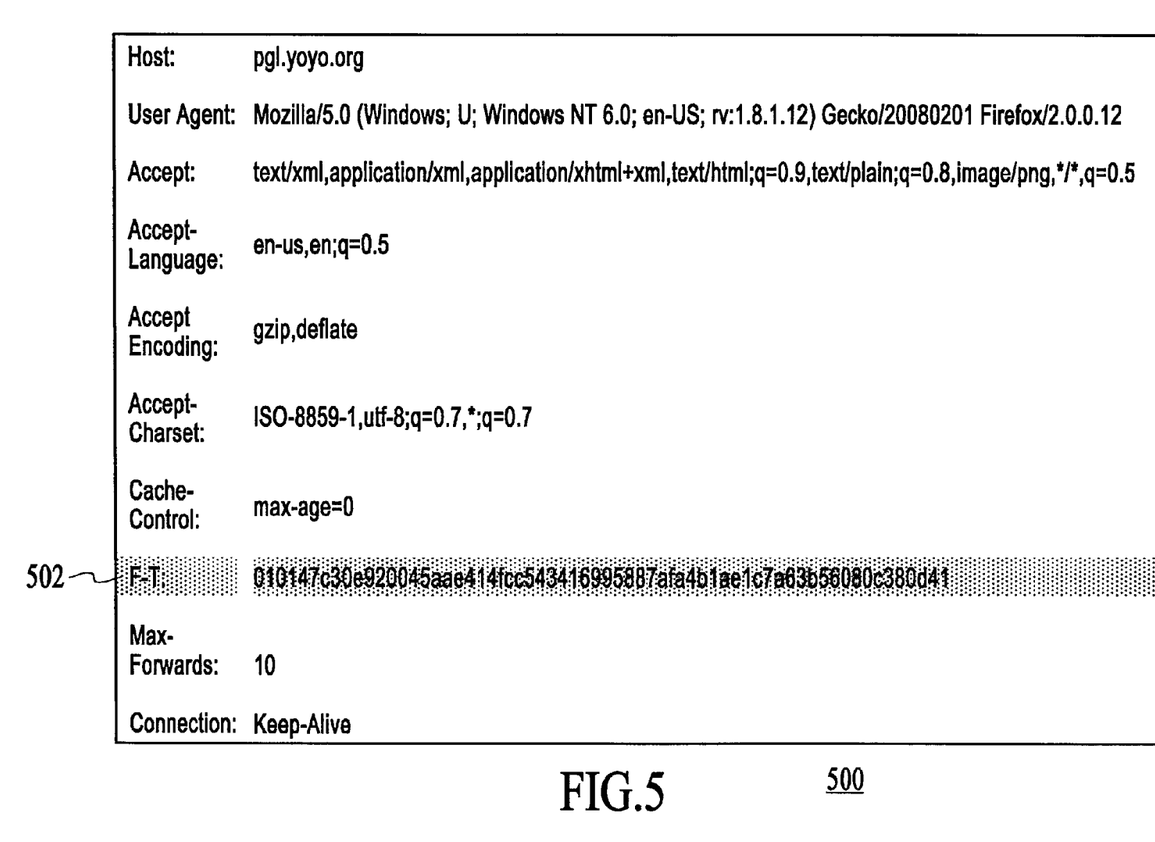
FIG. 5 illustrates an HTTP header including a network traffic tag, according to is an embodiment.

FIG. 5 illustrates an example HTTP header including a network traffic tag, according to an embodiment. The header shown in FIG. 5 has some example values entered for each of the requisite fields. A standard HTTP header includes various fields such as the Host field specifying the URL, of the destination site, the User-Agent field specifying the web browser program on the client, an Accept field specifying the format accepted by the browser, an Accept Language field, an Accept Encoding field, and Accept Character Set field, a Cache Control field, a Max-Forwards field and a Connection field. The HTTP header also includes one or more extensible fields that are essentially blank, but can be used to store additional data. For the embodiment illustrated in FIG. 5, the RID is encoded in HTTP header 500 as a tag (or watermark) in a field denoted "F-T" 502. The RID tag is encoded as a hexadecimal number of a defined length. The length and position of the RID tag within the HTTP header can be modified depending upon system constraints and requirements.

Figure 6:
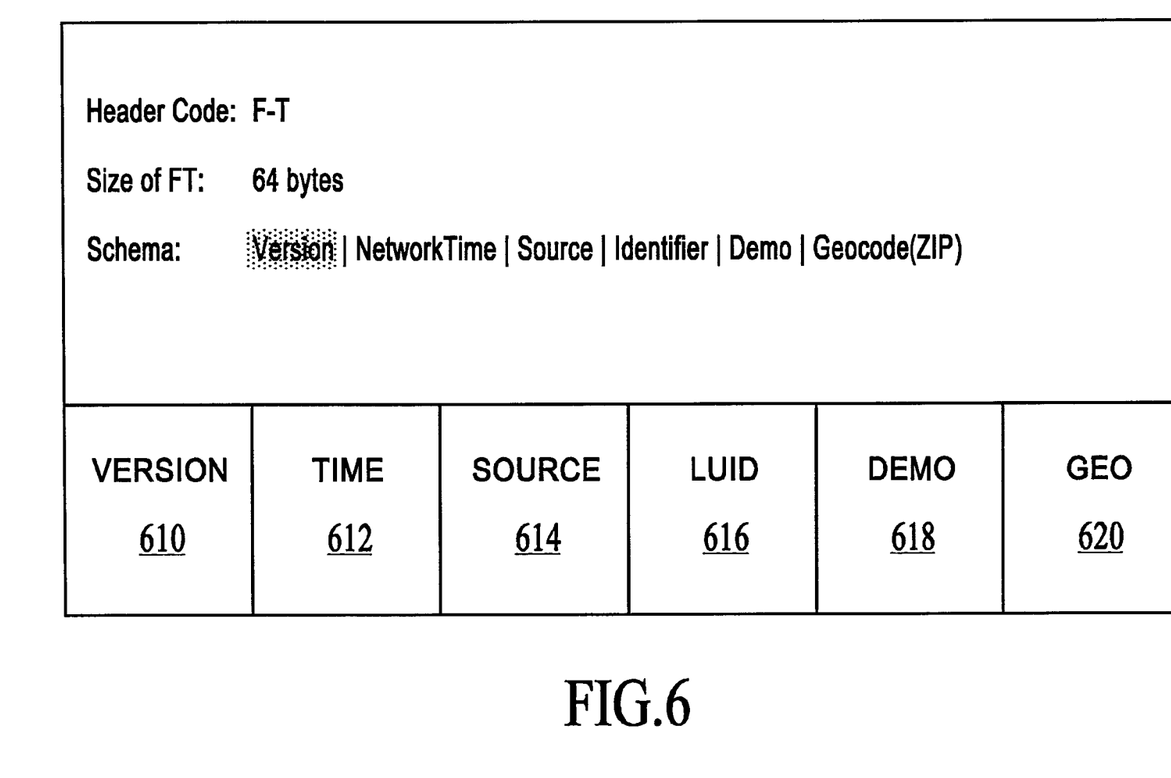
FIG. 6 illustrates the composition of the RID tag, under an embodiment.

FIG. 6 illustrates the composition of the RID tag, under an embodiment. As shown in FIG. 6, the RID tag 600 is specified by a header code (e.g., F-T), and has a specified size, for example 64 bytes. The schema 602 illustrates the actual coding of the data elements within the RID. The version field 610 contains a control code that uniquely identifies the RID and is different for every HTTP request. The Time field 612 encodes the time that the request was transmitted from the client. The Source field 614 contains the unique ID associated with the client. The LUID field 616 contains the local user ID generated through the hash process executed by the tag processor component in block 304 of FIG. 3. The Demographic field 616 encodes the demographic data for the user. The Geographic field 620 encodes the location data of the client device. As shown in field 502 of FIG. 5, an example RID tag in the F-T field comprises the values for each of these fields into a single hexadecimal number of length 64-bytes. Each individual field can be encoded according to a specific scheme. For example, the geographic data could comprise zip or zip+4 data, latitude/longitude, or street address data that is encoded into a corresponding hexadecimal number. Likewise, the demographic data comprises a hexadecimal number that corresponds to the profile information relating to various characteristics (e.g., gender, race, age, etc.) of the user. Actual coding schemes can be defined by the user. Similarly, each of the other fields encodes their respective data into hexadecimal values. Alternatively, any other appropriate numerical base, other than hexadecimal, could be used to encode the RID tag.

With reference to FIG. 4, in block 408, the destination site intercepts the RID from the HTTP header and passes it on to any associated ad partner or supplemental content provider. Many popular web destinations use advertising partners to provide and place ads. They may also have content partners or search engines or other media/content services. These supplemental servers are normally used to send a request for particular information related both to the destination website as the request from the user. The RID is used to enhance the relevance of the ads or supplemental messages provided by these supplemental servers. It can be used to select appropriate ads from a set of ads, or tailor ads for specific users by insertion of customized information. In the case of a TCP Option request, sockets are used to extract the RID information and require either a software stack or network appliance.

In general, the destination site (server computer 210 or ad partner 212) receive and collect the tagged RIDs as they are extracted from the HTTP requests sent by the client computer. In one embodiment, they may be provided with decoding capability so that they can extract the corresponding location and demographic information directly themselves. In a preferred embodiment, however, this decoding process is provided by a separate process provided by TRP 214. Thus, for the embodiment shown in FIG. 4, in block 410, the destination site, or the ad server/supplemental server queries TRP 214 to decipher the true value embedded in the request ID. This is typically accomplished by decoding the RID value encoded in the HTTP header (or TCP Option). The TRP then returns specific profile information to the destination site or ad partner. This information comprises the geographic (location) demographic, technographic, psychographic, or other values pertaining to the RID. The destination or ad partner then uses the profile information to direct appropriate content to the user, block 414. This appropriate content is referred to as "directed media" and can comprise a media tag identifying a media or type of media, and can consist of or reference advertisement messages, coupons, video content, audio content, or any other media which is tailored to the user identity, location, and/or preferences.

In one embodiment, the user information (e.g., geographic, demographic, psychographic information) for the tag is obtained at run-time. In the context of an ad-serving application or any other third party content or supplemental message serving system, run-time refers to the moment when the ad or supplemental message is served to the user and displayed on the user device. For this embodiment, the tag is decrypted by the content provider in real-time coincident with the web-based request by the user. This allows the content provider to serve the appropriate message or ad based on the generic anonymous data of the user, thus enabling the delivery of targeted content to specific users or classes of users. The combination of real-time serving and decryption of tag information relating to the user efficiently enables the creation of dynamic ad campaigns and effective targeted ad serving to large populations of users. According to embodiments described herein, network statistics regarding a plurality of users can be obtained at runtime by the content provider and used for the aggregation of metrics regarding the users. This facilitates the creation of comprehensive ad campaigns and targeted content serving based user preferences, geographic data, and other related data that are tied to and obtained from persistent profiles associated with each individual user.

In one embodiment, the ad campaign management feature provided by the TRP allows for the implementation of certain advanced features, such as ad sequencing. In this embodiment, certain scheduling parameters can be set based on a static set of profile data or on periodically obtained profile data. A forecast module may provide a forecast of actual profile data based on historic profile data for a user or client computer, or predictions based on certain relevant trends. This information can be used by the content provider to automatically serve content based on previously obtained profile data. It also allows for the serving of messages based on content and/or defined business rules.

Figure 7:
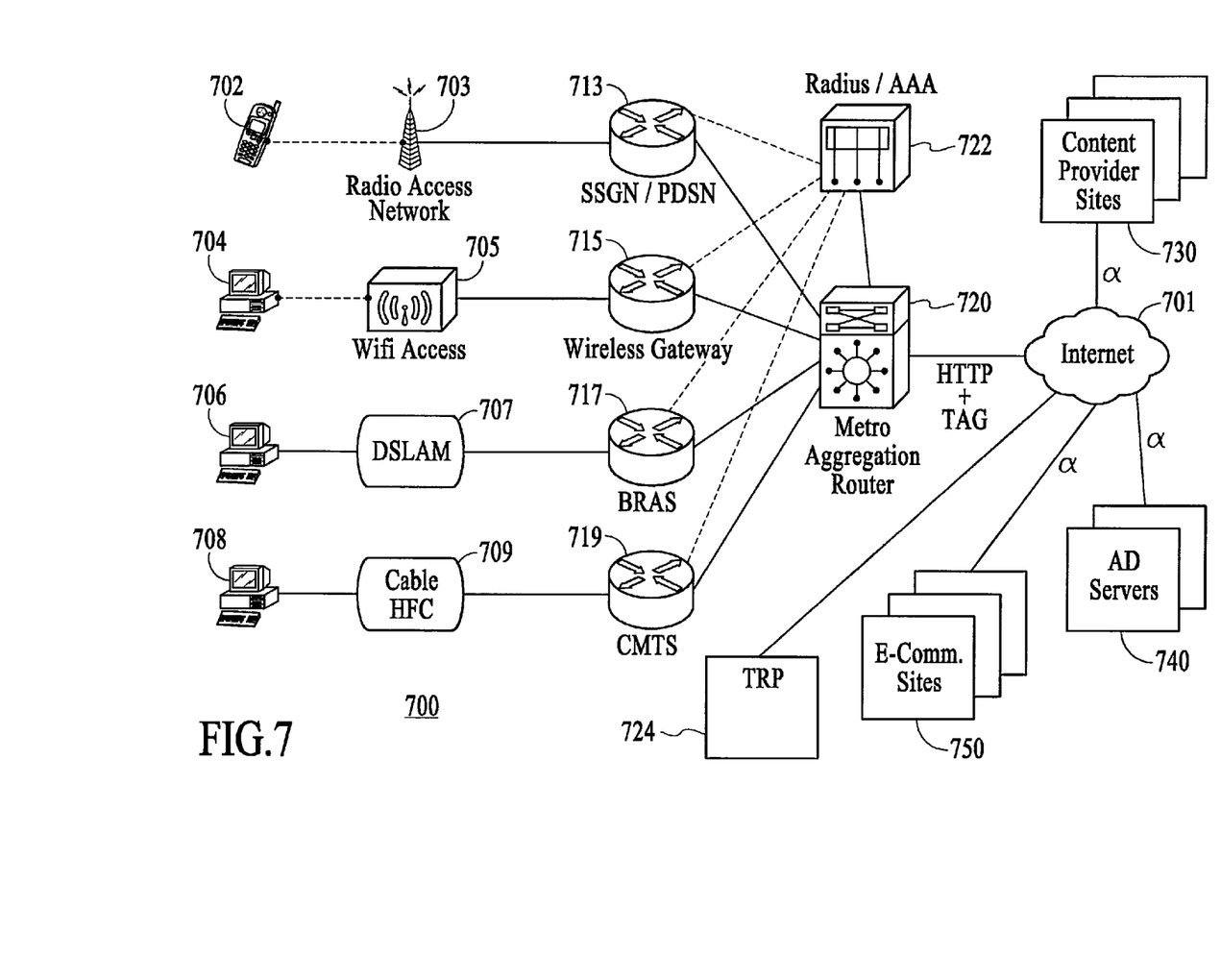
FIG. 7 illustrates a network system including a tag processor component within a router for multiple different client devices, under an embodiment.

As shown in FIG. 2, a network system connecting a client computer to a destination site maintained by a server computer can include several different types of client computers, as well as several different supplemental content providers. FIG. 7 illustrates a network system including a tag processor component within a router for multiple different client devices, under an embodiment. As shown in FIG. 7, a number of different client computers are coupled to a single router 720 through various access points and gateway/router devices. For example, a mobile phone 702 access router 720 through a radio access network 703 and an SSGN/PDSN (Serving CPRS Support Node/Packet Data Serving Node) router 713. Wireless client 704 goes through a wireless access point 705 and wireless gateway 715 to access router 720. Home client computer 706 accesses router 720 through a Digital Subscriber Line Access Multiplexer (DSLAM) 706 and a broadband remote access server (BRAS) 717. Client computer 708 utilizes a cable HFC (hybrid fiber coax) modem or router 709 and accesses router 720 through cable modem termination system (CMTS) 719. Each client computer has a unique ID, such as a MAC address, SIM address, or the like. An authentication server 722, such as provided by Radius/AAA authenticates the client ID associated with each gateway that is connected to router 720. In one embodiment, router 720 includes or is tightly coupled to a tag process component. This component generates an RID from an LUID and certain geographic/demographic information, as shown in FIG. 3 and FIG. 4. It also encodes the RID information as a tag in the HTTP header of the network traffic from the respective client computer. The HTTP header and tag (or watermark) is then transmitted over Internet 701 to the destination site. The existence of the RID tag UID's during different stages of network processing is depicted in FIG. 7 by the "a" symbol. The destination site could be an e-commerce site 750 that is associated with one or more of an ad server 740 and/or a supplemental content provider site 730. The TRP 724 decodes the RID information for use by the destination site and any associated ad or supplemental server site.

Figure 8:
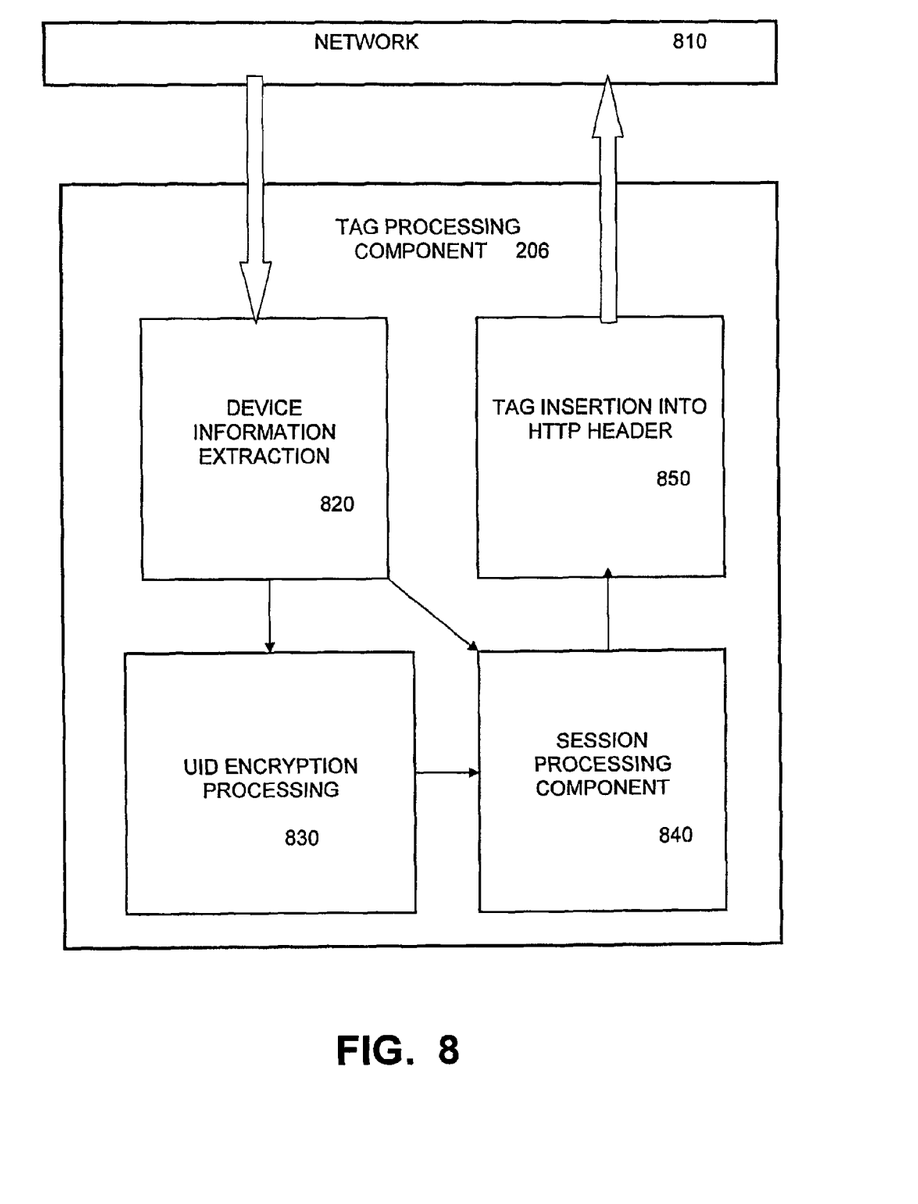
FIG. 8 is a block diagram illustrating the components of tag processing component, under an embodiment.

As shown in FIG. 2, the carrier NOC 204 includes or is tightly coupled to tag process 206. Through this incorporation of functionality at the carrier NOC level, the RID is incorporated into the network traffic essentially at main pipeline, such that all traffic from the client to the destination site is appropriately tagged. In one embodiment, the tag process 206 is also incorporated in router 720 of FIG. 7. The tag process includes several functional components that facilitate the encoding of the RID data into the HTTP header or other extensible field. FIG. 8 is a block diagram illustrating the components of tag process 206 under an embodiment. The tag processing component 206 includes a device information extraction component 820 that receives information from network 810. This device information extraction component derives relevant ID information for the client device and passes it along to a UID encryption processing component 830 and a session processing component 840. The session processing component then provides the encrypted DID information to an insertion module 850 that inserts the tag into the HTTP header. The encoded (tagged) header is then transmitted out to network 810.

As shown in the flowchart of FIG. 4, the destination sites extract the tag from the network packet and send a tag decryption/analysis request along with the tag to TRP component 214. The TRP component itself consists of a decode process 216 and an RTMS process 218. The functionality of TRP 214 includes and is not restricted to, receiving, deciphering and fulfilling the requests received from the destination sites in real and non-real time. The decode process interacts with and receives information from third party data providers, network carrier, and RCD and UID enabling components. The analysis performed on this data is used eventually to fulfill the request received by the destination sites. This process generally involves extracting the hexadecimal numbers associated with the relevant fields (LUID, Demo, Geo, etc.) and performing a database lookup to find the corresponding location and geographic data. This data is then passed back to the destination site in any type of appropriate format accepted by the destination site, that is, zip code, address, text description of user profile, and so on. In one embodiment, the tagged RIP comprises or contains a key that facilitates the database lookup operation by the TRP. In one embodiment, it is the LUID, which is the hashed HID for the client device, which acts as the secure encrypted key for this operation.

As described in relation to FIG. 5, the RID tag may comprise an alphanumeric text string that is encoded within a specific section of a data packet within the request command sent from or built up based on the user device/access for transmission over the network, such as encoded within a header portion of the command, such as the HTTP header, and can be of any format that is capable of encoding device/user identifying information and other parameters relevant to the device/user, and/or representations thereof, such that tags provide unique differentiation from other devices/users. The tag may encode relevant user information, which may be non-PII information, though is not limited thereto. The tags can be encrypted via any appropriate encryption techniques. Separate encoding and decoding components may be provided in the user and content provider computing devices and/or the routing or other RCD devices associated with these computing devices. Alternatively, common or unitary encoding and decoding components may be provided in a central server or RCD device that is coupled to both the user and content provider computing devices. In general, any extensible space of the header or similar portion of a pervasively used network traffic component can be used.

In one embodiment, the processing of the RID tag is handled by the RTMS (Real Time Market Segmentation) process 218 in TRP 214. The RTMS system is used to process the tag in real-time such that the consumer of the tag can then make a decision based on the reply from the RTMS system. Another example application of the RTMS system is to save the tags for a period of time to allow the RTMS system to process all of the tags in batch. In return, the consumer of the tags receives a tabular report containing the associated parameters of each tag or/and a aggregate report of all of the tags, such as how many tags or percentage of the tags are from a certain zip code or concentrated in certain period of the date/time. An alternate manner in which the mechanics of an RTMS system could be implemented is to make it directly available at the tag consumer site, which allows the consumers of the tag to decrypt the tag and its associated values.

The RTMS system is responsible for processing tag requests from the destination sites and replying to them with RTMS parameters. It also collects data for billing purpose and trend analysis. The RTMS process is designed to handle requests in real-time with extremely fast response time. The RTMS process is also capable of handle batch requests in large volume in non-real-time mode.

In generating the RID tag, the tag process 206 utilizes several different items of information in addition to the LUID. These include demographic information relating to the user. Such data can be sourced by third party data sources, such as direct marketing data, psychographic data, and preference data provided by user questionnaires or provided in a database. Other relevant information that might be used include carrier data provided by the network carrier.

Consistent with such overall system processing, a method of processing information associated with web/network-related requests throughout all phases of network processing and information delivery is disclosed. An example method, here, may comprise receiving a web/network-related request initiated via a device and/or a user associated with a device, wherein the request is appended with a unique identifier (UID) that is an anonymous identifier contained in the HTTP header or other extensible locations within the request, transmitting the UID to an information provider associated with the UID, and receiving profile/identification information regarding the device or the user via the information provider.

Regarding, in particular, the wireless implementation addressed above, the present invention provides particular advantages pertaining to direct access, location, traffic and network operations. With respect to direct access, the present invention provides direct connection to the customer and eliminates third party involvement in the delivery of content, as well as allowing for the licensee/subscriber/vendor to be the starting point of each and every communication (e.g., page, flash page, search, etc.) with the customer. With respect to location, the present invention provides the exact location of the customer, providing significantly greater value to related advertising and information. In other words, the more granular the information is about the customer, the more valuable it is to the advertisers (e.g., for directed advertising and other communications). Alternately, a more generalized location may be provided for the customer, such as region, zip code, etc., to protect user anonymity. With respect to traffic considerations, the cost methodologies addressed herein provide for greater accessibility, as costs present a significant competitive barrier. Specifically, embodiments of the present inventive methodology can provide free access by users, rather than requiring some sort of direct revenue from the end-user (although there can be fees associated with each subscription). Thus, regarding the maximization of traffic, these embodiments are particularly advantageous for networks that are; (1) carrier class, (2) easy to log onto, and (3) ubiquitous. Finally, with respect to network operations, the present methodology provides relatively low equipment costs with respect to prior network access of this nature, as well as the capability of avoiding the expenses of otherwise implementing/managing a network of this quality.

The technology set forth herein has particular applicability to the operation of WiFi networks, and especially companies closely associated with WiFi technology. The systems and methods of the present invention provide numerous advantages in the areas of network management and operation, data collection and aggregation, real-time provision of user demographics, location and other information, and reporting of WiFi network usage (summaries, aggregates, even real-time). For example, the WiFi embodiments have specific applicability to service providers, portals, and internet ad intermediaries.

For example, these WiFi embodiments provide unique advantages to service providers like VoIP (Voice over IP) Internet telephony companies, such as authentication or authorization of the telephones on log-in, logging of the calls for statistics and billing, network management (e.g., bandwidth, ports, etc.), and security management (e.g., firewall, eliminating unwanted third parties, etc.). These WiFi embodiments also provide significant advantages to portals, such as real-time user demographics and location that allow for immediate, directed advertising. These WiFi embodiments also provide significant advantages to internet ad intermediaries, such as information management applicable to all of the many layers of service providers involved in having an ad (e.g., banner) displayed on a web page.

In another exemplary implementation, the present invention may help prevent click-fraud, or other activity of interest performed by users of the network. Here, the TRP component has information about identifiers (such as MAC addresses) of every device on the network. This information can be associated with the cumulative number of clicks (on advertisements, marketing media etc), which can then be used to trigger a further audit if there is an anomalous number of clicks. This may allow an operator of the network, for example, to provide information about such anomalous behavior. This can be important, as the total number of clicks can be also traced to the number of clicks on a particular website and/or a particular advertiser's content. As a result, the invention can be used as both an alerting mechanism and then a tracing mechanism to monitor and prevent click-fraud. In addition, if it is required, access to the network can be blocked for the offending device based on its identifier, so the user cannot access the network and continue with fraudulent or non-compliant practices.

In a further exemplary implementation, the present invention may also provide benefit in the areas of security and access control. Again, since user identifiers (such as MAC address) are known in the network, they can be mapped into dynamic databases which are used as a secondary mechanism of physical machine verification for access to networks, websites, and/or specific classes of digital content on a network or networks. Since the TRP component has a database of all devices, it can interface with a large number of third-party databases. For example, it can interface with databases of allowed users who have high priority for access to the network in case of an emergency response situation, such as one directed, for example, to the whole network or just to a specific geographic location. Therefore, multiple classes of access, rules, syntax, and associations of such databases are done inside the TRP component, enabling the network to develop intelligent rules for access to services and content based on unique combinations of these databases, and apply them to the identifier of the device.

In yet another exemplary implementation, the present invention may also provide benefit in the area of rule-based blocking of content. Specifically, the TRP component may be employed to ensure that "no" content is delivered when none is desired. This functionality may be applicable, for example, when a network TV broadcast is scheduled for particular show times in certain regions in the world, or when movies and other digital content, such as music, are released in a carefully controlled fashion in a network. By having rules associated with content of this type, the TRP component can determine if the user has the rights to receive and play the appropriate content. Such rights not being based solely on traditional DRM techniques, but rather on the time, location, and other parameters that the content provider can specify. For example, if an online program is released in Australia, with a release time scheduled hours later in New York, then the content provider can tag the content such that it cannot be downloaded and/or played until the appropriate release time determined by the content creator/distributor. Utilization of specific user identifiers ensures a layer of digital rights management enforceable via the network by association of the identifier and the TRP component, by virtue of database interfaces, with the content rights and rules to be enforced by the content distributor.

The described method of tag insertion can be implemented on many different types of IP traffic protocols, such as HTTP, TCP, SIP, VoIP, etc depending on the nature of the application environment. The insertion can be conducted at different, or even multiple layers of the OSI stack implementation. The network based processing of these data and insertion processes makes the identification and classification of the user/user-device anonymous and persistent, especially when compared to cookies implemented at Layer 7/Application. Layer, as used by existing web-serving technologies.

In one embodiment, the functional components described herein may be implemented as functionality programmed within one or more units of a router, or similar connectivity device that functions to interconnect one or more processing units in a network system.

In the present description, the terms component, module, and functional unit, may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the present invention. Alternatively, the modules can comprise programming instructions transmitted to a general purpose computer or to graphics processing hardware via a transmission carrier wave; or they may be implemented as hardware logic circuitry.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other embodiments of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more embodiments of the following invention.

What is claimed is:

1. A method for improving the selection of media for delivery to a targeted user of a client computing device, comprising:
    determining user information for a user;
    generating a user identifier for the user from the determined user information;
    tagging, with a network routing device, network traffic that is bound for a destination site, the tagging including:
        generating a request identifier by encrypting the user identifier in an alphanumeric string, and
        adding the request identifier to the network traffic to generate tagged network traffic;
    transmitting the tagged network traffic to the destination site;
    receiving from a requester associated with the destination site a decode request to decode the tagged network traffic;
    decoding the tagged network traffic to obtain the user identifier;
    retrieving stored user information associated with the user identifier; and
    transmitting the stored user information to the requester.

2. The method of claim 1, wherein the request identifier comprises a key that provides access to a set of stored user information.

3. The method of claim 1, wherein the stored user information associated with the user identifier includes: previously determined demographic information related to the user, previously determined geographic information related to the user, or previously determined user determining user preferences.

4. The method of claim 1, further comprising maintaining, or updating, or both, the stored user information.

5. The method of claim 1, wherein the determining user information includes:
    determining demographic information related to the user,
    determining geographic information related to the user, and
    determining user preferences.

6. The method of claim 5, wherein the user identifier is generated using the determined demographic information and determined geographic information.

7. The method of claim 5, wherein the tagging further includes encrypting the determined user information in the alphanumeric string, and wherein decoding the tagged network traffic further includes obtaining the encrypted user information, the method further comprising storing the obtained user information with the stored user information associated with the user identifier.

8. The method of claim 5, wherein the determined user preferences include: profile data, browsing patterns, site preferences, product preferences, consumption preferences, or service preferences.

9. The method of claim 5, wherein the determined user preferences include: user network usage information, the user network usage information including one or more of: usage frequency, usage patterns, length of sessions, or time of use.

10. The method of claim 1, wherein generating the user identifier includes determining a unique device identifier for a client computing device.

11. The method of claim 10, wherein generating the user identifier includes performing a one-way hashing operation on the unique device identifier to generate the local user identifier.

12. The method of claim 10, further comprising verifying a right of the client computing device based in part on the unique device identifier.

13. The method of claim 12, wherein the right of the client computing device determines a time that content may be accessed.

14. The method of claim 1, wherein after the transmitting the stored user information to the requester, the requester, using a server, transmits targeted content to the user, the targeted content determined by the requester based in part on the user information.

15. The method of claim 14, wherein the targeted content was chosen by the requestor based on demographic information within the transmitted user information.

16. The method of claim 14, wherein the targeted content was chosen by the requestor based on geographic information within the transmitted user information.

17. The method of claim 16, wherein the targeted content includes information about one or more commercial interests.

18. The method of claim 16, wherein the targeted content includes information about a location itself.

19. The method of claim 17, wherein the targeted content includes information about local events.

20. A method for improving the selection of media for delivery to a targeted user, comprising:
    determining, at a server, user information for a user;
    generating, at the server, a user identifier for the user from the determined user information;
    receiving, at the server from a requester associated with a destination site, a decode request to decode tagged network traffic, wherein the tagged network traffic was transmitted to the destination site from a network routing device, and wherein the network routing device had tagged intercepted network traffic to create the tagged network traffic, the tagged network traffic including a request identifier comprising the user identifier encrypted in an alphanumeric string;
    decoding, at the server, the tagged network traffic to obtain the user identifier;
    retrieving, at the server, stored user information associated with the user identifier; and
    transmitting, at the server, the stored user information to the requester.

21. A method for improving the selection of media for delivery to a targeted user, comprising:
    determining, by a network routing device, user information for a user;
    generating, by the network routing device, a user identifier for the user from the determined user information;

tagging, with the network routing device, network traffic that is bound for a destination site, the tagging including:
  generating a request identifier by encrypting the user identifier in an alphanumeric string, and
  adding the request identifier to the network traffic to generate tagged network traffic; and
transmitting, by the network routing device, the tagged network traffic to the destination site, the destination site receiving stored user information from a server after the destination site transmitted a decode request to a server to decode the tagged network traffic.

\* \* \* \* \*

(12) INTER PARTES REVIEW CERTIFICATE (1907th)
United States Patent
Shah et al.

(10) Number: US 9,659,314 K1
(45) Certificate Issued: Feb. 12, 2021

(54) METHOD AND APPARATUS FOR TAGGING NETWORK TRAFFIC USING EXTENSIBLE FIELDS IN MESSAGE HEADERS

(71) Applicants: Nitin J. Shah; Jasminder S. Banga; Miten Sampat; Amul Patel

(72) Inventors: Nitin J. Shah; Jasminder S. Banga; Miten Sampat; Amul Patel

(73) Assignee: Bridge and Post, Inc.

Trial Number:

IPR2018-00321 filed Dec. 18, 2017

Inter Partes Review Certificate for:

Patent No.: 9,659,314
Issued: May 23, 2017
Appl. No.: 14/512,348
Filed: Oct. 10, 2014

The results of IPR2018-00321 are reflected in this inter partes review certificate under 35 U.S.C. 318(b).

INTER PARTES REVIEW CERTIFICATE
U.S. Patent 9,659,314 K1
Trial No. IPR2018-00321
Certificate Issued Feb. 12, 2021

AS A RESULT OF THE INTER PARTES REVIEW PROCEEDING, IT HAS BEEN DETERMINED THAT:

Claims 1-21 are cancelled.

\* \* \* \* \*